UNITED STATES PATENT OFFICE.

LEON McCULLOCH, OF WILKINSBURG, PENNSYLVANIA, ASSIGNOR TO WESTINGHOUSE ELECTRIC & MANUFACTURING COMPANY, A CORPORATION OF PENNSYLVANIA.

ACID-PROOF VARNISH.

1,411,050.  Specification of Letters Patent.  Patented Mar. 28, 1922.

No Drawing.   Application filed May 13, 1918.   Serial No. 234,121.

*To all whom it may concern:*

Be it known that I, LEON McCULLOCH, a citizen of the United States, and a resident of Wilkinsburg, in the county of Allegheny and State of Pennsylvania, have invented a new and useful Improvement in Acid-Proof Varnishes, of which the following is a specification.

My invention relates to varnishes and more particularly to varnishes for rendering the coils of dynamo electric machines proof against water, acid fumes or alkalis.

I have found that the addition of a small amount of paraffine or a paraffine-like wax to a varnish, which is, in itself, resistant to water, acid fumes and alkalis, will render the varnish considerably more resistant to them. This is particularly true of baking asphalt varnishes, such as asphalt baking japan and is attributed to the fact that the paraffine, on baking, fills all the pores of the varnish films, and perhaps, also, itself forms a very thin film over the varnish.

All varnish, japan and enamel films are quite readily permeable to water and when immersed in water, soften or swell up and so tend to loosen from the surfaces to which they are applied. For instance, a film formed of a certain black baking enamel permitted passage of 0.002 grams of water per square centimeter in twenty-four hours. Another film formed of the same enamel, after the addition of a wax, in this instance ceresin, permitted the passage of only 0.00005 grams of water per square centimeter in twenty-four hours.

I have made a number of comparison tests of the resistance of cotton fabrics, coated with various varnishes and enamels, to nitric and sulfuric acids and have found that the addition of paraffine, or other equivalent waxes, to the varnishes and enamels employed greatly increases the resistance, endurance and life of the coated fabric.

Various waxes, other than paraffine, may be employed such as ozocerite, ceresin, petrolatum, halgenated naphthalines such as halowax including the mono-di-tro- and tetra-chloro-naphthalines and the like, together with various solvents, such as benzine, turpentine, benzol, or in fact any varnish solvent.

It may be noted that the addition of the small amount of wax necessary to produce suitable results has no appreciable effect upon the hardness, toughness, appearance and other desirable qualities of the varnish, japan or enamel, other than to give to them a slightly waxy surface or "feel".

One composition which I have found extremely efficient comprises:

Asphalt baking japan, 1 gallon; paraffine, ½ pound, in solution in benzine, 1 gallon.

In forming this composition, the paraffine is dissolved in the benzine and the varnish is thinned with the resultant solution.

Obviously, other varnishes may be employed and the proportions may be varied to suit different circumstances and to meet different requirements and I, therefore, reserve the right to make any alterations, both in proportions used and ingredients employed, which may come within the scope of the appended claims. Furthermore, the term varnish, as used in these claims, is intended to cover all varnishes, japans or enamels suitable for the purpose.

I claim as my invention:

1. A varnish composition consisting of a varnish thinned with a solution of a wax in benzine.

2. A varnish composition consisting of a varnish thinned with a solution of paraffine.

3. A varnish composition consisting of a baking varnish thinned with a substantially equal volume of a solution of paraffine.

4. A varnish composition for protection of insulation of electrical apparatus from acid fumes and moisture comprising substantially one gallon of asphalt baking japan thinned with a solution of substantially ½ pound of paraffine in one gallon of benzine.

5. A varnish composition for protection of insulation of electrical apparatus comprising substantially one gallon of a varnish thinned with a solution of substantially one-half pound of wax in one gallon of a solvent.

6. A varnish composition for protection of electrical insulation comprising substantially one gallon of a baking varnish thinned with a solution of substantially one-half pound of wax in one gallon of benzine.

In testimony whereof, I have hereunto subscribed my name this 3rd day of May, 1918.

LEON McCULLOCH.